UNITED STATES PATENT OFFICE.

HERMANN SCHULTZE, OF GRIESHEIM, GERMANY, ASSIGNOR TO CHEMISCHE FABRIK GRIESHEIM ELECTRON, OF FRANKFORT-ON-THE-MAIN, GERMANY, A SOCIETY.

MANUFACTURE OF CHLORIN COMPOUND OF LIME.

934,467.　　　Specification of Letters Patent.　　Patented Sept. 21, 1909.

No Drawing.　　Application filed April 27, 1907.　Serial No. 370,701.　(Specimens.)

*To all whom it may concern:*

Be it known that I, HERMANN SCHULTZE, a subject of the German Emperor, and a resident of Griesheim-on-the-Main, Germany, doctor of philosophy, have invented certain new and useful Improvements in the Manufacture of Chlorin Compounds of Lime, of which the following is a specification.

In chlorinating calcium hydroxid for the manufacture of the so-called liquid calcium chlorid, it has not been possible to much exceed a contents of from 100, to 110, grams of active chlorin per liter (specific gravity 1.15). Lunge in his "*Handbuch der Soda-Industrie*", 2 edition, Vol. 111, page 426, has even stated that it is not advisable to exceed a specific gravity of 1.14, as otherwise a conversion into calcium chlorate will take place. As a matter of fact, it has been observed that on further passing chlorin through milk of lime, the filtrate of which has a specific gravity of 1.15 and contains from 100, to 110, grams of active chlorin, the contents in chlorin, *i. e.*, the difference between the total chlorin and the active chlorin, greatly increases. This observation has led to the supposition that chlorate is formed, as such formation is also connected with an increase in the amount of chlorin contained in the chlorid. I have however found that the observed increase in the amount of chlorin contained in the chlorid (bleaching powder) is due to quite a different cause. In concentrating the solution to the specific weight of 1.15, a point is reached at which the further introduction of chlorin causes the precipitation of difficultly soluble combinations of the hypochlorite with lime, when a milk of lime of approximately 16° Baumé is employed. If chlorination be further proceeded under these conditions, the filtrate of the solution shows no increase in active chlorin, but only in calcium chlorid for according to the following equation:

$$2Ca(OH)_2 + 4Cl = Ca(OCl)_2 + CaCl_2 + 2H_2O$$

one molecule of $CaCl_2$ is formed for each molecule of $Ca(OCl)_2$ precipitated, with the lime, the molecule of $CaCl_2$ remaining in the solution. There is indeed a decrease of the contents in active chlorin in the solution, as the increase of the calcium chlorid in the solution decreases the solubility of the basic compounds. These compounds crystallize in well-shaped crystals, but as they are decomposed by water and cannot therefore be re-crystallized, they are difficult to obtain in a state of purity for analyzing purposes. No doubt is here a question of various compounds corresponding to the formula $Ca(OCl)_2.xCa(OH)_2$. The compounds $Ca(OCl)_2.2Ca(OH)_2$ and $Ca(OCl)_2.4Ca(OH)_2$ have been isolated. These basic compounds are those bodies which, on dissolving ordinary bleaching powder in water, retain with obstinacy active chlorin in the residue, for to decompose them completely into lime and dissolved hypochlorite requires a large quantity of water and the decomposition proceeds extremely slowly. The fine cloudiness occurring frequently in solutions of bleaching powder and many other still unexplained properties of ordinary bleaching powder are probably attributable to the existence of these basic compounds.

The hereinbefore described basic compounds possess a property which is of great importance in the arts, for they are again decomposed on being further treated with chlorin, the bound molecules of $Ca(OCl)_2$ being dissolved while the four molecular proportions of $Ca(OH)_2$ are chlorinated. If, therefore, a chlorinated milk of lime of a specific gravity of 1.16 be mixed with a calculated amount of lime, and chlorin be led through it without troubling about the precipitation of the basic compound, until the basic compounds have again decomposed, solutions of calcium chlorid of any degree of concentration required can be obtained. The complete reactions therefore take place as follows:

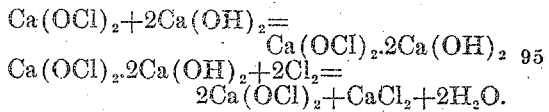

$$Ca(OCl)_2 + 2Ca(OH)_2 = Ca(OCl)_2.2Ca(OH)_2$$
$$Ca(OCl)_2.2Ca(OH)_2 + 2Cl_2 = 2Ca(OCl)_2 + CaCl_2 + 2H_2O.$$

It is even possible to carry the concentration so far that the pure crystallized $Ca(OCl)_2$ is precipitated directly, or by the addition of an easily soluble salt (for instance calcium chlorid).

The following are examples of how this invention can be carried out.

Example 1: Lime containing 6.4 parts of water for each part of CaO the specific weight of this milk of lime being about 60° Baumé is chlorinated, without troubling about the precipitation of the basic compounds, until nearly all the lime is used up.

A solution is obtained which contains from 180, to 190, grams per liter of chlorin, and only a small excess of the calcium chlorid, and only from 1 to 2 grams of chlorate, per liter. It has a specific weight of 1.26 and can be used in lieu of concentrated eau de Javelle (liquor of Javelle).

Example 2: If the solution obtained in accordance with Example 1 be again mixed with CaO, with, or without, water, and the calculated amount of chlorin be passed through it, a large quantity of crystallized $Ca(OCl)_2$ is precipitated, the crystals being identical with those obtained by evaporation. By frequently repeating this operation, almost the whole of the hypochlorite can be precipitated. The precipitation is preferably expedited by the addition of calcium chlorid. After filtering off and washing out, the crystals thus obtained can, by rapid drying, at a temperature not exceeding 60° C. be converted into a stable form.

I claim—

1. The herein described process of manufacturing compounds of calcium hypochlorite, consisting in making milk of lime, chlorinating the latter beyond the specific gravity of 1.15, adding as much lime as is necessary to precipitate the said compounds, and introducing chlorin, substantially as and for the purpose set forth.

2. The herein described process of manufacturing compounds of calcium hypochlorite, consisting in making milk of lime, chlorinating the latter beyond the specific gravity of 1.15, adding as much lime as is necessary to precipitate the said compounds, introducing chlorin until the solution is of such concentration that $Ca(OCl)_2$ is precipitated and quickly drying the precipitate, substantially as and for the purpose set forth.

3. The herein described process of manufacturing compounds of calcium hypochlorite, consisting in making milk of lime, chlorinating the latter beyond the specific gravity of 1.15, adding as much lime as is necessary to precipitate the said compounds, introducing chlorin and salting out the solid $Ca(OCl)_2$ by calcium chlorid and quickly drying the precipitate, substantially as and for the purpose set forth.

In testimony whereof I have signed my name to this specification in the presence of two subscribing witnesses.

HERMANN SCHULTZE.

Witnesses:
 FRANZ HASSLACHER,
 JEAN GRUND.